US011421305B2

(12) United States Patent
Wiesner

(10) Patent No.: US 11,421,305 B2
(45) Date of Patent: Aug. 23, 2022

(54) CAST ALLOY

(71) Applicant: Rheinfelden Alloys GmbH & Co. KG, Rheinfelden (DE)

(72) Inventor: Stuart Wiesner, Rheinfelden (CH)

(73) Assignee: Rheinfelden Alloys GmbH & Co. KG

( * ) Notice: Subject to any disclaimer, the term of this patent is extended or adjusted under 35 U.S.C. 154(b) by 0 days.

(21) Appl. No.: 16/094,336

(22) PCT Filed: May 2, 2016

(86) PCT No.: PCT/EP2016/059724
§ 371 (c)(1),
(2) Date: Oct. 17, 2018

(87) PCT Pub. No.: WO2017/182103
PCT Pub. Date: Oct. 26, 2017

(65) Prior Publication Data
US 2019/0119792 A1   Apr. 25, 2019

(30) Foreign Application Priority Data

Apr. 19, 2016 (EP) .................................. 16165976

(51) Int. Cl.
*C22C 21/08* (2006.01)
*C22F 1/047* (2006.01)
*C22F 1/043* (2006.01)
*C22C 21/00* (2006.01)

(52) U.S. Cl.
CPC .............. *C22C 21/08* (2013.01); *C22C 21/00* (2013.01); *C22F 1/043* (2013.01); *C22F 1/047* (2013.01)

(58) Field of Classification Search
CPC .................................. C22C 21/08; C22C 21/06
See application file for complete search history.

(56) References Cited

U.S. PATENT DOCUMENTS

| | | | |
|---|---|---|---|
| 1,932,845 A * | 10/1933 | Dean ....................... | C22C 21/06 420/547 |
| 2,090,894 A | 8/1937 | Matuenaga | |
| 3,211,547 A | 10/1965 | Jarrett et al. | |
| 4,169,728 A * | 10/1979 | Takeuchi ................ | C22C 21/10 420/532 |
| 4,222,830 A | 9/1980 | Dawless et al. | |
| 4,412,870 A | 11/1983 | Vernam et al. | |
| 4,711,762 A | 12/1987 | Vernam et al. | |
| 4,874,578 A * | 10/1989 | Hornberger ............ | C22C 21/06 420/541 |
| 5,667,602 A * | 9/1997 | Fang ....................... | C22C 21/06 148/415 |
| 6,364,970 B1 | 4/2002 | Hielscher et al. | |
| 6,773,664 B2 * | 8/2004 | Spanjers ................. | C22C 21/06 420/541 |
| 7,462,410 B2 | 12/2008 | Gouke | |
| 8,083,244 B2 | 12/2011 | Buschjohann et al. | |
| 8,206,519 B2 | 6/2012 | Howells et al. | |
| 9,663,845 B2 | 5/2017 | Wiesner et al. | |
| 2004/0170523 A1 | 9/2004 | Koch | |
| 2005/0207934 A1 | 9/2005 | Gagniere et al. | |
| 2005/0224145 A1 | 10/2005 | Laslaz et al. | |
| 2006/0011321 A1 | 1/2006 | Koch | |
| 2006/0169371 A1 | 8/2006 | Cosse et al. | |
| 2006/0213590 A1 | 9/2006 | Danielou et al. | |
| 2007/0240796 A1 | 10/2007 | Koch et al. | |
| 2008/0295922 A1 * | 12/2008 | Zhao ....................... | C22C 21/06 148/439 |
| 2009/0214381 A1 | 8/2009 | Trenda et al. | |
| 2010/0074796 A1 | 3/2010 | Franke | |
| 2010/0288401 A1 | 11/2010 | Hennings et al. | |
| 2011/0265606 A1 * | 11/2011 | Ito .......................... | B22D 11/003 75/414 |
| 2014/0140886 A1 | 5/2014 | Speckert et al. | |
| 2015/0098859 A1 | 4/2015 | Hauck et al. | |
| 2016/0250683 A1 | 9/2016 | Wang et al. | |

FOREIGN PATENT DOCUMENTS

| | | |
|---|---|---|
| CH | 199536 | 8/1938 |
| CN | 103397228 A | 11/2013 |
| CN | 104299675 A | 1/2015 |
| DE | 1211800 A | 3/1966 |
| DE | 10351666 B3 | 1/2005 |
| DE | 10352932 A1 | 6/2005 |
| DE | 60320387 T2 | 8/2008 |
| DE | 102008055928 A1 | 8/2009 |
| DE | 102008055929 A1 | 8/2009 |

(Continued)

OTHER PUBLICATIONS

Davis, J.R. "Metals Handbook: Desk Edition", 2nd edition, pp. 426-436. (Year: 1998).*
Hufnagel, "Key to Aluminum Alloys 4th Edition", 1991, Aluminium-Verlag GmbH, Dusseldorf, Germany, p. 78-79.
Brunhuber, "Giesserei Lexikon", 1994, pp. 122-123 and 1289-1292 (statement of relevance attached).
Davis, Alloying: Understanding the Basics, "Aluminum and Aluminum Alloys", pp. 371-373, 377, 383, 385, and 387-388, 2001.
Davis et al., "Metals Handbook Desk Edition", 2nd Ed., ASM International, 1998, pp. 433.
Hufnagel, "Key to Aluminum Alloys", 4th ed., 1991, pp. 71-72, 78, and 178.

(Continued)

*Primary Examiner* — George Wyszomierski
*Assistant Examiner* — Janell C Morillo
(74) *Attorney, Agent, or Firm* — The Webb Law Firm

(57) ABSTRACT

A cast alloy including iron 0.8-3.0 wt. %, magnesium 0.01-9.0 wt. %, manganese 0-2.5 wt. %, beryllium 0-500 ppm, titanium 0-0.5 wt. %, silicon 0-0.8 wt. %, strontium 0-0.8 wt. %, phosphorus 0-500 ppm, copper 0-4 wt. %, zinc 0-10 wt. %, 0-0.5 wt. % of an element or a group of elements selected from the group consisting of chromium, nickel, molybdenum, zirconium, vanadium, hafnium, calcium, gallium and boron, and the remainder being aluminium and unavoidable impurities.

14 Claims, No Drawings

(56) References Cited

FOREIGN PATENT DOCUMENTS

| | | |
|---|---|---|
| DE | 102008046803 A1 | 3/2010 |
| DE | 102009012073 A1 | 9/2010 |
| DE | 102010055011 A1 | 6/2012 |
| DE | 102011112005 A1 | 2/2013 |
| EP | 0297035 A1 | 12/1988 |
| EP | 0687742 B1 | 9/1997 |
| EP | 0853133 B1 | 5/2001 |
| EP | 1698710 A1 | 9/2006 |
| EP | 1443122 B1 | 7/2009 |
| EP | 1612286 B1 | 7/2011 |
| EP | 2657360 A1 | 10/2013 |
| EP | 2735621 A1 | 5/2014 |
| EP | 2738273 A1 | 6/2014 |
| EP | 2653579 B1 | 10/2014 |
| GB | 476930 | 12/1937 |
| GB | 518075 | 2/1940 |
| GB | 546899 | 8/1942 |
| GB | 604813 | 7/1948 |
| GB | 605282 | 7/1948 |
| GB | 616413 | 1/1949 |
| JP | 63179036 A | 7/1988 |
| JP | 63179037 A | 7/1988 |
| JP | 2001279726 A | 10/2001 |
| KR | 1020130083183 A | 7/2013 |
| WO | 2005071127 A1 | 8/2005 |
| WO | 2006122341 A2 | 11/2006 |
| WO | 2009082495 A1 | 7/2009 |

OTHER PUBLICATIONS

Nielsen et al., "Aluminium-Taschenbuch", pp. 62, 63, 336, and 337 (statement of relevance attached), 1974.

Ostermann, "Anwendungstechnologie Aluminium", pp. 10, 11, 30, and 186 (statement of relevance attached), 2014.

Skachkov et al., "Introduction of Scandium, Zirconium and Hafnium into Aluminum Alloys. Dispersion Hardening of Intermetallic Compounds with Nanodimensional Particles", Nanosystems: Physics, Chemistry, Mathematics, 2014, pp. 603-612, vol. 5 No. 4.

Europaische Norm EN 1706, Mar. 2010, pp. 2,10, 11, 13. (Relevant for the Tables).

Hufnagel, "Key to Aluminium Alloys", 4th ed., 1991, pp. 111, 119, Aluminium-Verlag GmbH, Dusseldorf, Germany.

"Huttenaluminium-Gusslegierungen"; Rheinfelden Alloys GmbH & Co.KG, Aug. 2018. (Relevant for composition and properties of Silafont 38).

Kearney et al., "Aluminum Foundry Products", ASM Handbook, 1990, pp. 123-151, vol. 2.

Loper et al., "Influence of Trace Amounts of Phosphorous in Al Casting Alloys—A Review of the Literature", AFS Transactions, 2000, pp. 667-672.

"Neue Anwendungsbereiche fur Strukturbauteile"; VDI-Fachmedien, konstruktion-online, Sep. 2017.

"Recycling-Gusslegierungen fur Automobil-Strukturbauteile", AluReport, Mar. 2012, pp. 14-15.

Wang, "Physical Metallurgy of Aluminum Alloys", ASM Handbook, 2018, pp. 43-79, vol. 2A.

* cited by examiner

CAST ALLOY

CROSS-REFERENCE TO RELATED APPLICATIONS

This application is the United States national phase of International Application No. PCT/EP2016/059724 filed May 2, 2016, and claims priority to European Patent Application No. 16165976.8 filed Apr. 19, 2016, the disclosures of which are hereby incorporated in their entirety by reference.

BACKGROUND OF THE INVENTION

Field of the Invention

The invention relates to a cast alloy based on aluminium, magnesium and iron, in particular for use in vehicle structural components.

Description of the Related Art

Alloys of the type AlFe are generally known and according to some literature references are regarded as the so-called 8000 series alloys, a group of alloys of aluminium forgeable alloys. In addition, numerous publications mention intermetallic AlFe materials, also called iron aluminides, which have a high iron content and further alloying elements. These materials are not cast materials. They are used in powder metallurgy (for example for surface coating), in sintering processes, in 3D printing methods or the like. Depending on the application, properties, such as magnetizability, heat resistance or high corrosion resistance, are mentioned.

The patent literature in the area of AlFe alloys points to the use of this alloy for sheet metal, extruded products, coating technology and the use of this alloy in powder products. U.S. Pat. No. 8,206,519 B2, U.S. Pat. No. 7,462, 410 B2, US 2006 0 213 590 A1, and DE 60 320 387 T2 may be mentioned at this point as being representative of a plurality of patent publication in the area of forgeable alloy products. A further field of use for AlFe alloys is magnetic components which serve for information storage. In the said fields of use, neither the castability nor the influencing of material characteristic values via the selective addition of alloying elements plays a part.

In the area of cast alloys, in particular for die-cast alloys, the alloy systems Al—Si and Al—Mg—Si are used primarily. The applicant itself has been active for many years in the area of developing die-cast alloys for automotive engineering. EP 1 443 122 B1 and EP 1 612 286 B1 may be mentioned at this point as being representative for a corresponding number of patents already granted. Both protective rights relate to an AlSi9Mn alloy for structural components and have good material characteristic values even in the cast state.

The lightweight construction of the automotive industry requires simple, robust manufacturing processes. In the case of structural components this means, inter alia, dispensing with heat treatments. In this manner not only is a manufacturing process step saved, but also aligning works which usually have to be executed due to the distortion which cannot be avoided. Furthermore, it is required to be able to carry out a surface treatment process at temperatures of 190° C. and more without an effect on the material characteristic values of the alloy occurring. Further requirements consist in an alloy having simple processability, this includes simple meltability, a low tendency to adhesion during casting or simple handling of the return material. In addition to simple manufacturing processes, alloy costs play a considerable part. Here, there is a requirement for an alloy which does not contain costly alloying elements. Furthermore, the possibility should exist for using secondary raw materials, for example secondary aluminium, since resources may be protected accordingly in this manner.

SUMMARY OF THE INVENTION

The object of the present invention is to make available a cast alloy based on aluminium-magnesium-iron which fulfils at least one of the demands mentioned above.

According to the invention, this object is achieved by the following cast alloy which comprises or consists of:
iron 0.8 to 3.0% by weight
magnesium 2.0 to 7.0% by weight
manganese 0-2.5% by weight
beryllium 0-500 ppm
titanium 0-0.5% by weight
silicon 0-0.8% by weight
strontium 0-0.8% by weight
phosphorus 0-500 ppm
copper 0-4% by weight
zinc 0-10% by weight
0-0.5% by weight of an element or a group of elements selected from the group consisting of chromium, nickel, molybdenum, zirconium, vanadium, hafnium, calcium, gallium and boron, with the remainder being aluminum and unavoidable impurities.

In one embodiment, die iron content of the cast alloy lies between 1.0-2.4% by weight iron.

In a further embodiment, the iron content of the cast alloy lies between 1.4-2.2% by weight iron.

In one embodiment, the magnesium content lies between 0.3-7.0% by weight magnesium.

In a further embodiment, the magnesium content of the cast alloy lies between 2.0-7.0% by weight magnesium.

In a further embodiment, the magnesium content of the cast alloy lies between 3.0-5.0% by weight magnesium.

In one embodiment, the manganese content lies between 0-0.6% by weight.

In one embodiment, the beryllium content lies between 0-100 ppm.

In one embodiment, the strontium content lies between 0-0.03% by weight.

In one embodiment, the zinc content lies between 0-0.5% by weight.

In one embodiment, the phosphorus content lies between 0-50 ppm.

In one embodiment, the copper content lies between 0-0.2% by weight copper.

In one embodiment, the titanium content lies between 0-0.1% by weight.

In one embodiment, the silicon content lies between 0-0.4% by weight.

The alloy of the invention is preferably used for die-casting, in particular for die-casting structural components for automotive engineering. For example, a method of making a structural component may comprise die-casting the inventive alloy to form the structural component.

If a cast alloy is mentioned below, this comprises an alloy, in particular for die-casting, ingot casting or sand casting.

DESCRIPTION OF THE INVENTION

The present invention is directed to a cast alloy comprising: iron 0.8-3.0% by weight, magnesium 0.01 to 9.0% by weight, manganese 0-2.5% by weight, beryllium 0-500 ppm, titanium 0-0.5% by weight, silicon 0-0.8% by weight, strontium 0-0.8% by weight, phosphorus 0-500 ppm, copper 0-4% by weight, zinc 0-10% by weight, 0-0.5% by weight of an element or a group of elements selected from the group consisting of chromium, nickel, molybdenum, zirconium, vanadium, hafnium, calcium, gallium and boron, with the remainder being aluminium and unavoidable impurities.

The alloy of the invention is based on an alloy system AlFe which hitherto has not been used in cast alloys for automotive engineering. This system is likewise ductile and may be solidified by magnesium without trinary phases AlMgFe being produced. The Al—Al$_3$Fe eutectic is used for the alloy of the invention, whereby this alloy becomes good for casting. The Al$_3$Fe eutectic has a known abnormal structure. Its solidification morphology is likewise described in the literature.

Without additional elements, apart from the base elements aluminium, iron and magnesium, yield strengths of 70 MPa with elongations at break of 20% and a bending angle, according to Daimler specification DBL 4918, of 90°, may be achieved with the alloy of the invention. The composition is characterized likewise by a high electrical and thermal conductivity.

It can be derived from the AlMgFe phase diagram that at a magnesium content of 0-9% by weight and an iron content of 0-3% by weight, an Al$_3$Fe phase is produced. Furthermore, it is known that in addition, an Mg$_5$Al$_8$ phase is formed which is designated mostly as Al$_3$Mg$_2$. This phase occurs from a higher Mg content. The solubility of magnesium in aluminium from 327° C. is high enough to dissolve over 7% by weight magnesium. Hence, the production of a magnesium-containing phase cannot be expected for the alloy of the invention. It is known that for binary AlMg alloys up to a content of 7% Mg, no appreciable deposition hardening is achieved, which likewise could be confirmed in the present investigations. The AlMg eutectic lies at about 35% Mg proportion and does not play a part in the alloy of the invention. A ternary phase AlMgFe cannot be expected.

The proportion of iron is selected so that sufficient eutectic Al—Al$_3$Fe is present and fine, intermetallic phases are formed. Magnesium is added to set the required strength.

Reference is made in the literature to a shrinkage-reducing effect of the iron. In addition, a silicon-free Al$_3$Fe eutectic is produced at 0.4% by weight Si-containing alloys. Silicon can be found in the Al phase and no AlFeSi phase is formed. These correlations could be confirmed in die present investigations. Therefore care should be taken to keep the silicon content sufficiently low, that is, at about 0.2% by weight, since otherwise an AlFeSi phase is formed and embrittlement of the material can be expected. Furthermore, a false, say too highly set silicon content leads to sludge formation in the heating furnace and therefore to problems in the manufacture of the alloy. Due to impurities, the occurrence of such a phase is fundamentally possible to a limited extent, even though Mg:Si as a stable phase binds silicon.

The alloy of the invention fundamentally can be used diversely, but is aimed at a use in structural components in automotive engineering. The demands for crash-relevant structural components may thus be achieved even in the cast state. It differs in a series of points significantly from the hitherto used alloys. The high time stability and thermal stability of the alloy of the invention is advantageous. Heat treatments of up to one hour (1 hour) at 400° C. could be used without a significant effect on the material characteristic values achieved in the state F occurring. Only from a temperature of 500° C. could first deviations be detected. Known alloys of the type AlSi10MnMg or AlMg5Si2Mn usually change their characteristic values considerably after thermal stress for 1 hour at 400° C.

Furthermore, the alloy of the invention is characterized by good riveting capability in the cast state, which is likewise not achieved by any alloy on the market hitherto.

It could be established that an alloy composition with low magnesium content, less than 0.5% by weight magnesium, has a high electrical conductivity of greater than 25 m/(Ωmm$^2$) [metres per Ohm square millimetre]. These values could be increased still further using a heat treatment.

Additional elements are possible.

Manganese contributes to a limited extent to increasing strength and may convert brittle AlFeSi beta phases into less disadvantageous AlMn—FeSi alpha phases. Beryllium reduces the tendency to oxidation of the melt. During casting of thick-walled components, predominantly titanium-boron grain refiners are used. In one embodiment of the alloy of the invention, copper and/or zinc is added, which significantly influences the strength of the alloy. Hardening occurs, the material reacts to heat treatments due to the addition of copper and/or zinc. The time strength and heat resistance is influenced. Copper and/or zinc elements should only be selected if a yield strength of 150 MPa or above is required. At high zinc proportions, yield strengths of over 400 MPa may be achieved after T6 heat treatment.

A salt-spray alternating test (ISO 9227) and an intergranular corrosion test (ASTM G110-92) served to investigate the tendency to corrosion. The composition of the alloy of the invention is selected so that good corrosion resistance could be achieved in the case of the copper-free and zinc-free variant. Copper and zinc may lower corrosion resistance.

Examples

The compositions of exemplary embodiments (alloy variants A, B, C and D) of the alloy of the invention are compared below. The details are in % by weight. Using these four alloys, the mechanical characteristic values ($R_m$, $R_{p0.2}$, $A_5$ and bending angle) were measured on die-cast 3 mm plates. In each case the average value of 8 tension tests is shown.

|  | Mg | Fe | Si | Mn | Cu | Zn |
| --- | --- | --- | --- | --- | --- | --- |
| Variant A | 0.01 | 2.01 | 0.03 | 0.01 | 0.003 | 0.01 |
| Variant B | 0.48 | 2.10 | 0.04 | 0.01 | 0.003 | 0.01 |
| Variant C | 3.94 | 1.63 | 0.04 | 0.01 | 0.003 | 0.01 |
| Variant D | 6.01 | 1.56 | 0.04 | 0.33 | 0.003 | 0.01 |

|  | Ti | B | Sr | P | Be |
| --- | --- | --- | --- | --- | --- |
| Variant A | 0.006 | 0.000 | 0.000 | 0.0005 | 0.000 |
| Variant B | 0.006 | 0.000 | 0.000 | 0.0006 | 0.000 |
| Variant C | 0.002 | 0.000 | 0.000 | 0.0008 | 0.004 |
| Variant D | 0.006 | 0.004 | 0.030 | 0.0006 | 0.003 |

Results Achieved
State F (Cast State)

|  | Rm [N/mm²] | Rp$_{0.2}$ [N/mm²] | A5 [%] | Bending angle [°] |
|---|---|---|---|---|
| Variant A | 147 | 73 | 20.2 | 91 |
| Variant B | 169 | 82 | 15.3 | 68 |
| Variant C | 248 | 120 | 14.9 | 60 |
| Variant D | 285 | 150 | 9.3 | 45 |

The bending angle was determined according to Daimler specification DBL 4918 and is a measure of the riveting capability of a material.

Alloy variant B achieved an electrical conductivity of 26.1 m/(Ω mm²) in the cast state.

After a heat treatment of 1 hour at 500° C., 29.2 m/(Ω mm²) could be measured.

The invention claimed is:

1. A cast alloy consisting of:
   iron 1.4-3.0% by weight
   magnesium 2.0-7.0% by weight
   beryllium 0-500 ppm
   titanium 0-0.5% by weight
   silicon 0-0.2% by weight
   strontium 0-0.8% by weight
   phosphorus 0-500 ppm
   copper 0-4% by weight
   zinc 0.01% by weight maximum and
   0-0.5% by weight of an element or a group of elements selected from the group consisting of chromium, molybdenum, zirconium, vanadium, hafnium, gallium and boron, with the remainder being aluminium and unavoidable impurities.

2. The cast alloy according to claim 1, wherein iron is 1.4-2.4% by weight.

3. The cast alloy according to claim 1, wherein iron is 1.4-2.2% by weight.

4. The cast alloy according to claim 1, wherein magnesium is 3.0-7.0% by weight.

5. The cast alloy according to claim 1, wherein magnesium is 3.0-5.0% by weight.

6. The cast alloy according to claim 1, wherein beryllium is 0-100 ppm.

7. The cast alloy according to claim 1, wherein strontium is 0-0.03% by weight.

8. The cast alloy according to claim 1, wherein phosphorus is 0-50 ppm.

9. The cast alloy according to claim 1, wherein copper is 0-0.2% by weight.

10. A die-cast structural component for automotive engineering comprising the cast alloy of claim 1.

11. A cast alloy consisting of:
    iron 1.0-3.0% by weight
    magnesium 2.0-7.0% by weight
    beryllium 0-500 ppm
    titanium 0-0.5% by weight
    silicon 0-0.4% by weight
    strontium 0-0.8% by weight
    phosphorus 0-500 ppm
    copper 0-4% by weight
    zinc 0.01% by weight maximum and 0-0.5% by weight of an element or a group of elements selected from the group consisting of chromium, nickel, molybdenum, zirconium, vanadium, hafnium, gallium and boron, with the remainder being aluminium and unavoidable impurities.

12. The cast alloy according to claim 11, wherein the silicon is 0-0.2% by weight.

13. A die-cast structural component for automotive engineering comprising the cast alloy of claim 11.

14. A method of making a structural component comprising die-casting the alloy of claim 1 to form the structural component.

* * * * *

UNITED STATES PATENT AND TRADEMARK OFFICE
CERTIFICATE OF CORRECTION

PATENT NO. : 11,421,305 B2
APPLICATION NO. : 16/094336
DATED : August 23, 2022
INVENTOR(S) : Stuart Wiesner It is certified that error appears in the above-identified patent and that said Letters Patent is hereby corrected as shown below:

On the Title Page

Column 1, item (73) Assignee, Line 1, Delete "KG" and insert -- KG, (DE) --

In the Claims

Column 6, Line 23, Claim 11, after "chromium," delete "nickel,"

Signed and Sealed this
Sixteenth Day of July, 2024

Katherine Kelly Vidal
*Director of the United States Patent and Trademark Office*